United States Patent
An et al.

(10) Patent No.: US 7,812,785 B2
(45) Date of Patent: Oct. 12, 2010

(54) DISPLAY DEVICE AND METHOD OF DRIVING THE SAME

(75) Inventors: Bo-Young An, Suwon-si (KR); Seung-Bin Moon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 917 days.

(21) Appl. No.: 11/623,204

(22) Filed: Jan. 15, 2007

(65) Prior Publication Data
US 2007/0194319 A1   Aug. 23, 2007

(30) Foreign Application Priority Data
Feb. 20, 2006   (KR) ...................... 10-2006-0016376

(51) Int. Cl.
G09G 5/00   (2006.01)
(52) U.S. Cl. ........................................ 345/1.3; 345/1.1
(58) Field of Classification Search ........... 345/1.1–1.3, 345/98, 87, 99–103, 204–206, 214, 9; 455/566; 349/143; 257/72, E27.13, E27.132
See application file for complete search history.

(56) References Cited

U.S. PATENT DOCUMENTS

| | | | |
|---|---|---|---|
| 6,144,358 A * | 11/2000 | Narayanaswamy et al. | . 345/102 |
| 6,917,362 B2 * | 7/2005 | Pinedo et al. | 345/530 |
| 6,954,184 B2 * | 10/2005 | Kurashima et al. | 345/1.3 |
| 7,167,141 B2 * | 1/2007 | Goto et al. | 345/1.1 |
| 7,301,509 B2 * | 11/2007 | Yun et al. | 345/1.3 |
| 2008/0113821 A1 * | 5/2008 | Beadell et al. | 463/46 |

* cited by examiner

*Primary Examiner*—Richard Hjerpe
*Assistant Examiner*—Mansour M Said
(74) *Attorney, Agent, or Firm*—F. Chau & Associates, LLC

(57) ABSTRACT

A display device includes a first display panel, a first gate driver, a second display panel and a second gate driver. The first display panel includes a first display region, in which first gate lines are formed, and a first peripheral region surrounding the first display region. The first gate driver is formed at the first peripheral region and outputs a first gate signal to the first gate lines in response to a first clock signal and a second clock signal. The second display panel is electrically connected with the first display panel. The second display panel includes a second display region, in which second gate lines are formed, and a second peripheral region surrounding the second display region. The second gate driver is formed at the second peripheral region and outputs a second gate signal to the second gate lines in response to the first clock signal and second clock signal.

18 Claims, 7 Drawing Sheets

DISPLAY DEVICE AND METHOD OF DRIVING THE SAME

CROSS-REFERENCE TO RELATED APPLICATIONS

This application relies for priority to Korean Patent Application No 2006-16376, filed on Feb. 20, 2006, the disclosure of which is incorporated by reference herein.

BACKGROUND OF THE INVENTION

1. Technical Field

The present disclosure relates to a display device and a method of driving the display device. More particularly, the present disclosure relates to a display device capable of reducing the number of signals and the number of signal lines, and a method of driving the display device.

2. Discussion of the Related Art

Generally, a small or midsized liquid crystal display (LCD) apparatus may be classified as either a normal-folder type LCD apparatus or a dual folder type LCD apparatus according to the number of LCD panels. The dual-folder type LCD apparatus includes a main LCD panel displaying a main image and a sub LCD panel displaying a sub-image. For example, the sub-image shows additional data such as time, date and a receiving sensitivity.

The LCD apparatus provides a main driving signal for driving the main LCD panel and provides a sub-driving signal for driving the sub LCD panel.

The main LCD panel includes a main signal line transmitting the main driving signal, and a sub-signal line transmitting the sub-driving signal to the sub-LCD panel. The main LCD panel includes a display region displaying an image and a peripheral region surrounding the display region. The main signal line and the sub-signal line are formed on the peripheral region of the main LCD panel. Therefore, a small or midsized LCD apparatus may have a narrow bezel, because the sub-signal line is additionally formed at the peripheral region of the main LCD panel.

SUMMARY OF THE INVENTION

An exemplary embodiment of the present invention provides a display device which includes a first display panel, a first gate driver, a second display panel and a second gate driver. The first display panel includes a first display region, in which first gate lines are formed, and a first peripheral region surrounding the first display region. The first gate driver is formed at the first peripheral region and outputs a first gate signal to the first gate lines in response to a first clock signal and a second clock signal. The second display panel is electrically connected with the first display panel. The second display panel includes a second display region, in which second gate lines are formed, and a second peripheral region surrounding the second display region. The second gate driver is formed at the second peripheral region and outputs a second gate signal to the second gate lines in response to the first and second clock signals.

An exemplary embodiment of the present invention provides a method of driving a display device which includes a first display panel and a second display panel. The first display panel includes first gate lines and a first gate driver outputting first gate signals to the first gate lines. The second display panel includes second gate lines and a second gate driver outputting second gate signals to the second gate lines. The method of driving the display device includes outputting the first gate signals to the first gate lines in response to a first clock signal and a second clock signal and outputting the second gate signals to the second gate lines in response to the first clock signal and the second clock signal.

BRIEF DESCRIPTION OF THE DRAWINGS

The above and other features of the present invention will become readily apparent by describing in detail exemplary embodiments thereof with reference to the accompanying drawings, in which.

DETAILED DESCRIPTION OF EXEMPLARY EMBODIMENTS

It will be understood that when an element or layer is referred to as being "on" or "connected to" another element or layer, it can be directly on or connected to the other element or layer or intervening elements or layers may be present. Like numbers refer to like elements throughout.

Hereinafter, the embodiments of the present invention will be described particularly with reference to the accompanied drawings.

Figure 1:
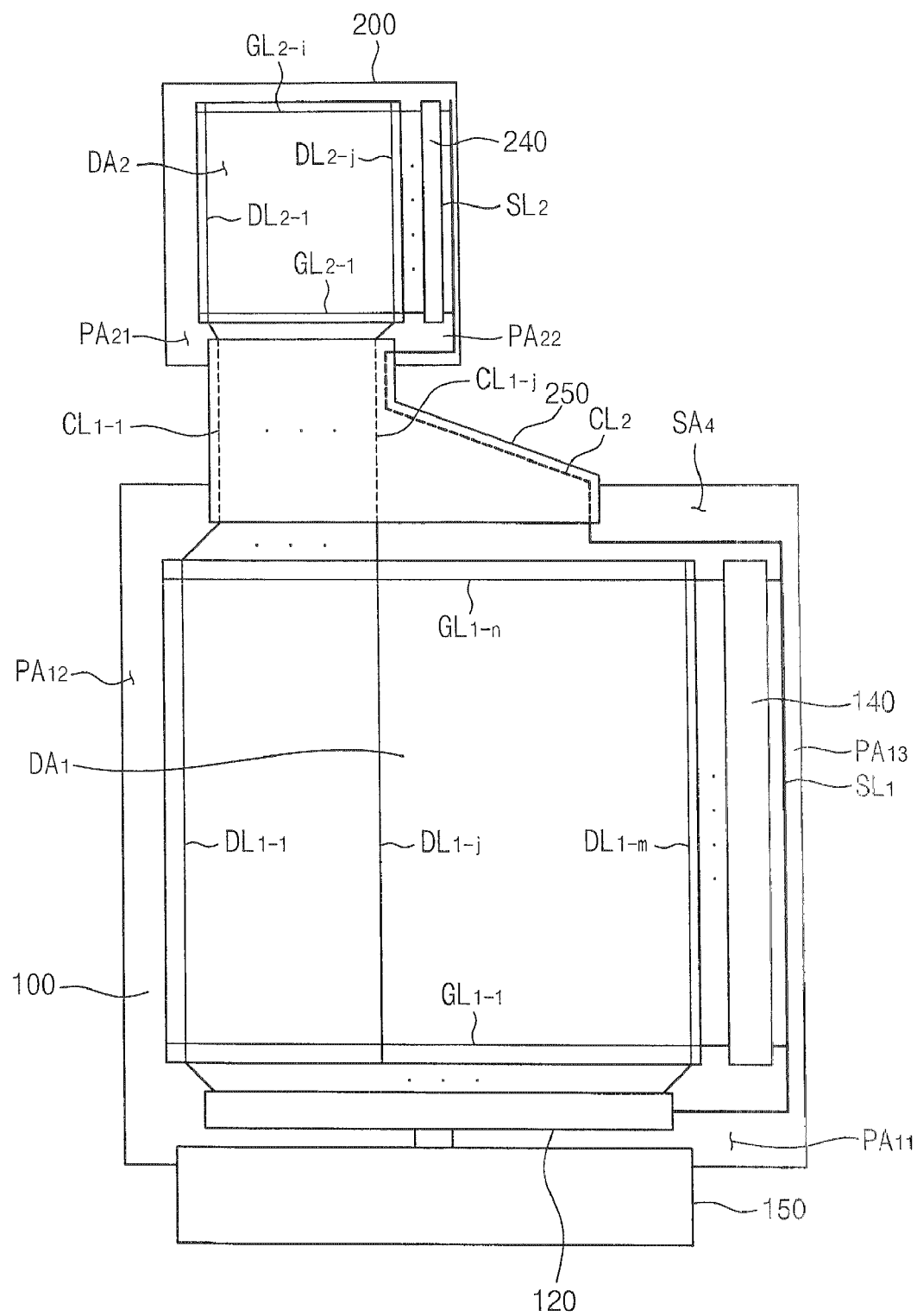
FIG. 1 is a plan view illustrating a display device in accordance with an exemplary embodiment of the present invention.

FIG. 1 is a plan view illustrating a display device in accordance with an exemplary embodiment of the present invention.

Referring to FIG. 1, the display device includes a first display panel 100, a first flexible printed circuit board (FPCB) 150, a second display panel 200 and a second FPCB 250. The first display panel 100 displays a main image. The second FPCB 150 connects the first display panel 100 to an external device. The second display panel 200 displays a sub-image. The second FPCB 250 connects the second display panel 200 to the first display panel 100.

The first display panel 100 includes a first array substrate (not shown), a first color filter substrate (not shown), a driver 120 and a first gate driver 140. The first display panel 100 includes a first display region $DA_1$, and a first peripheral region $PA_{11}$, a second peripheral region $PA_{12}$, a third peripheral region $PA_{13}$ and a fourth peripheral region $PA_{14}$, which surround the first display region $DA_1$. A plurality of gate lines $GL_{1\_1} \ldots GL_{1\_n}$ and a plurality of source lines $DL_{1\_1} \ldots DL_{1\_m}$ are formed in the first display region $DA_1$. The gate lines $GL_{1\_1} \ldots GL_{1\_n}$ are not parallel with the source lines $DL_{1\_1} \ldots DL_{1\_m}$. The number 'n' of the gate lines and the number 'm' of the source lines are integer numbers greater than one.

The driver 120 may be formed as a single chip mounted on the first peripheral region $PA_{11}$. The driver 120 receives a data signal and a control signal through the first FPCB 150 from an external device. The driver 120 outputs a driving signal for driving the first and second display panels 100 and 200. The driving signal includes a data signal, a first gate control signal, a second gate control signal, a common control signal and a gate voltage.

The first gate driver 140 may be formed as an integrated circuit, which is integrated at the second peripheral circuit $PA_{12}$. The first gate driver 140 includes a plurality of stages that are cascade-connected with each other. The first gate driver 140 outputs gate signals to the gate lines $GL_{1\_1} \ldots GL_{1\_n}$ based on the first gate control signal, the common control signal and gate signals provided from the driver 120.

The first gate control signal includes a first vertical start signal and a second vertical start signal according to a method of driving the first display panel 100. For example, when the first display panel 100 displays an image in one direction the first gate control signal may correspond to the first vertical start signal input to a first stage of the first gate driver 140. When the first display panel 100 displays an image in bi-directions, the first gate control signal may correspond to the first and second vertical start signal respectively input to the first stage and a last stage of the first gate driver 140.

The common control signal may include a first clock signal and a second clock signal. The common control signal is provided to the first and second gate drivers 140 and 240 through first and second signal line parts $SL_1$ and $SL_2$ formed at peripheral regions $PA_{13}$ and $PA_{22}$ of the first and second display panels 100 and 200. The first and second signal line parts $SL_1$ and $SL_2$ may include a first signal line through which the first clock signal is transmitted and a second signal line through which the second clock signal is transmitted.

The gate voltage may include a high-voltage and a low-voltage according to a circuit characteristic of the first and second gate drivers 140 and 240.

The second display panel 200 may include a second array substrate (not shown), a second color filter substrate (not shown) and the second gate driver 240. The second display panel 200 includes a second display region $DA_2$ through which an image is displayed, a first peripheral region $PA_{21}$ and a second peripheral region $PA_{22}$. The first and second peripheral regions $PA_{21}$ and $PA_{22}$ are formed at regions around the second display region $DA_2$. A plurality of gate lines $GL_{2\_1} \ldots GL_{2\_i}$ and a plurality of source lines $DL_{2\_1} \ldots DL_{2\_j}$ are formed in the second display region $DA_2$. The gate lines $GL_{2\_1} \ldots GL_{2\_i}$ are not in parallel with the source lines $DL_{2\_1} \ldots DL_{2\_j}$. The number 'i' of the gate lines and the number 'j' of the source lines are integer numbers greater than one. The number 'i' may be equal to or less than 'n' and the number 'j' may be equal to or less than 'm'.

The second gate driver 240 may be formed as an integrated circuit which is integrated at the second peripheral circuit $PA_{22}$. The second gate driver 240 includes a plurality of stages which are cascade-connected with each other. The second gate driver 240 outputs gate signals to the gate lines $GL_{2\_1} \ldots GL_{2\_i}$ based on second gate control signals, common control signals and gate signals provided from the drive 120.

The second gate control signals may be adjusted according to a method of driving the first display panel 100. For example, when the first display panel 100 displays an image in one direction, a second gate control signal may correspond to the third vertical start signal input to a first stage of the second gate driver 240. When the first display panel 100 displays an image in bi-directions, the second gate control signal may correspond to the third vertical start signal and the fourth vertical star signal inputted respectively to the first stage and a last stage of the second gate driver 240.

The second FPCB 250 electrically connects the second display panel 200 to the first display panel 100. An end portion of the second FPCB 250 makes electrical contact with the fourth peripheral region $PA_{14}$ of the first display panel 100, and another end portion thereof makes electrical contact with the first peripheral region $PA_{21}$ of the second display panel 200.

A plurality of first connecting line parts $CL_{1\_1} \ldots CL_{1\_j}$ is formed in the second FPCB 250. The first connecting line parts $CL_{1\_1} \ldots CL_{1\_j}$ electrically connect the source lines $DL_{1\_1} \ldots DL_{1\_j}$ of the first display panel 100 to the source lines $DL_{2\_1} \ldots DL_{2\_j}$ of the second display panel 200.

The second FPCB 250 includes a second connecting line part $CL_2$. The second connecting line part $CL_2$ electrically connects the first signal line part $SL_1$ of the first display panel 100 to the second signal line part $SL_2$ of the second display panel 200. The first and second signal line parts $SL_1$ and $SL_2$ transmit the common control signal.

Although not shown in FIG. 1, the first display panel 100 may include lines through which the first gate control signal and the gate voltage are transmitted. In addition, the first display panel 100, the second FPCB 250 and the second display panel 200 may include lines through which the second gate control signal rind the gate voltage are transmitted.

Figure 2:
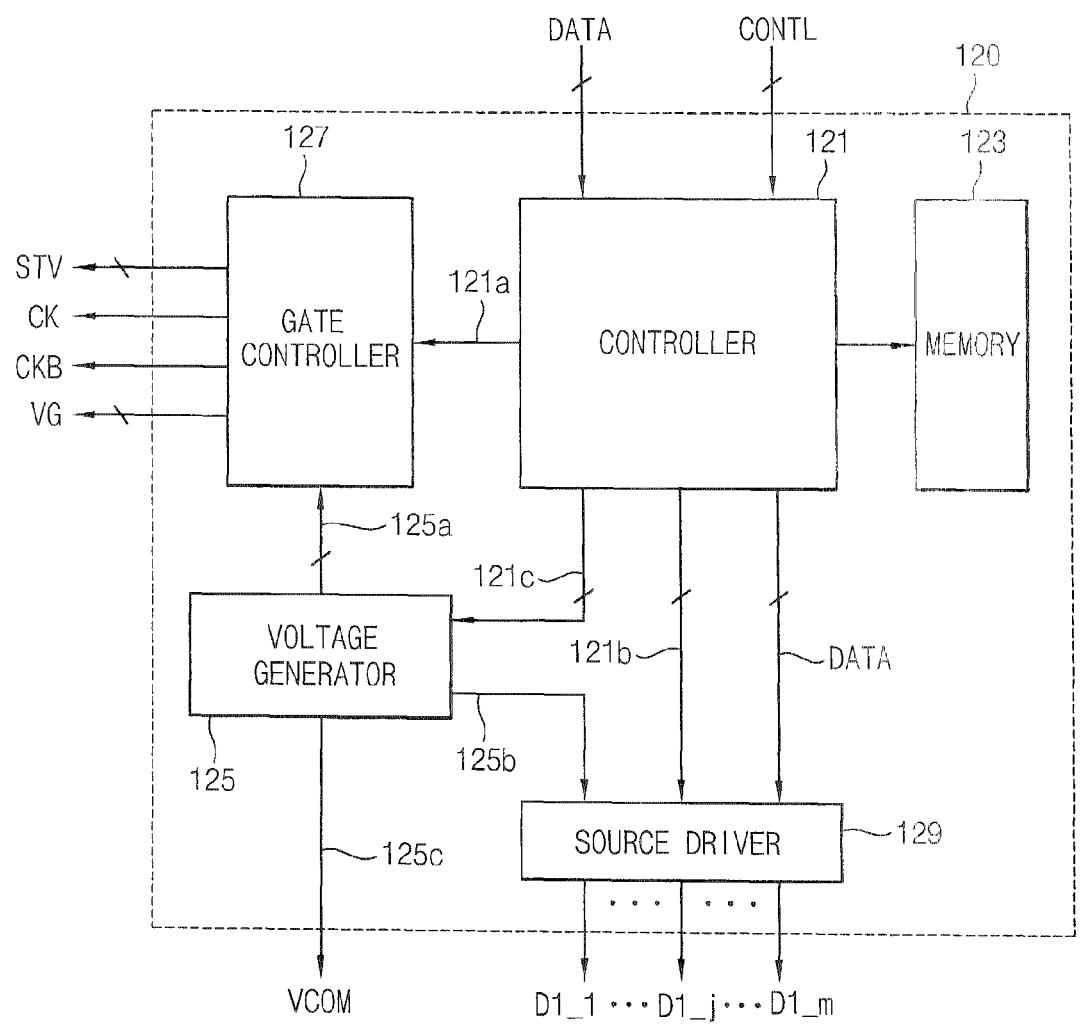
FIG. 2 is a detailed block diagram illustrating a driver in FIG. 1.

FIG. 2 is a detailed block diagram illustrating the driver 120 in FIG. 1.

Referring to FIGS. 1 and 2, the driver 120 includes a controller 121, a memory 123, a voltage generator 125, a gate controller 127 and a source driver 129.

The controller 121 receives a data signal DATA and a control signal CONTL. The control signal CONTL includes a horizontal synchronizing signal, a vertical synchronizing signal, a main clock signal and a data enable signal.

The controller 121 stores the data signal DATA in the memory 123 based on the control signal CONTL. The controller 121 outputs a first control signal 121*a* to the gate controller 127. The first control signal 121*a* may include the first gate control signals, the second gate control signals and the common control signals CK and CKB. The controller 121 outputs a second control signal 121*b* to the source driver 129. The second control signal 121*b* may include a source control signal of a horizontal start signal, a load signal, a reverse signal, etc. The controller 121 reads and outputs the data signal DATA stored in the memory 123. The controller 121 outputs a third control signal 121*c* to the voltage generator 125. The third control signal 121*c* may include the main clock signal and the reverse signal.

The voltage generator 125 generates driving voltages by using an external signal provided from the external device. The driving voltages may include a gate voltage VG 125*a*, a gamma reference voltage VREF 125*b*, a common voltage VCOM 125*c*, etc. The gate voltage VG 125*a* is provided to the gate controller 127, the gamma reference voltage VREF 125*b* is provided to the source driver 129 and the common voltage VCOM 125*c* is provided to the first and second display panels 100 and 200, respectively.

The gate controller 127 outputs the first and second gate control signals, the common control signal and the gate voltage to the first gate driver 140 and the second gate drivers 240, respectively.

The source driver 129 changes the data signal DATA read from the memory 123 into an analog signal based on the gamma reference voltage VREF 125b. Then, the source driver 129 outputs the first data voltage corresponding to the first display panel 100 to m number of source lines $D1\_1 \ldots D1\_m$. In addition, the source driver 129 outputs the second data voltage corresponding to the second display panel 200 to i number of source lines $D_{1\_1} \ldots D_{1\_j}$.

Figure 3:
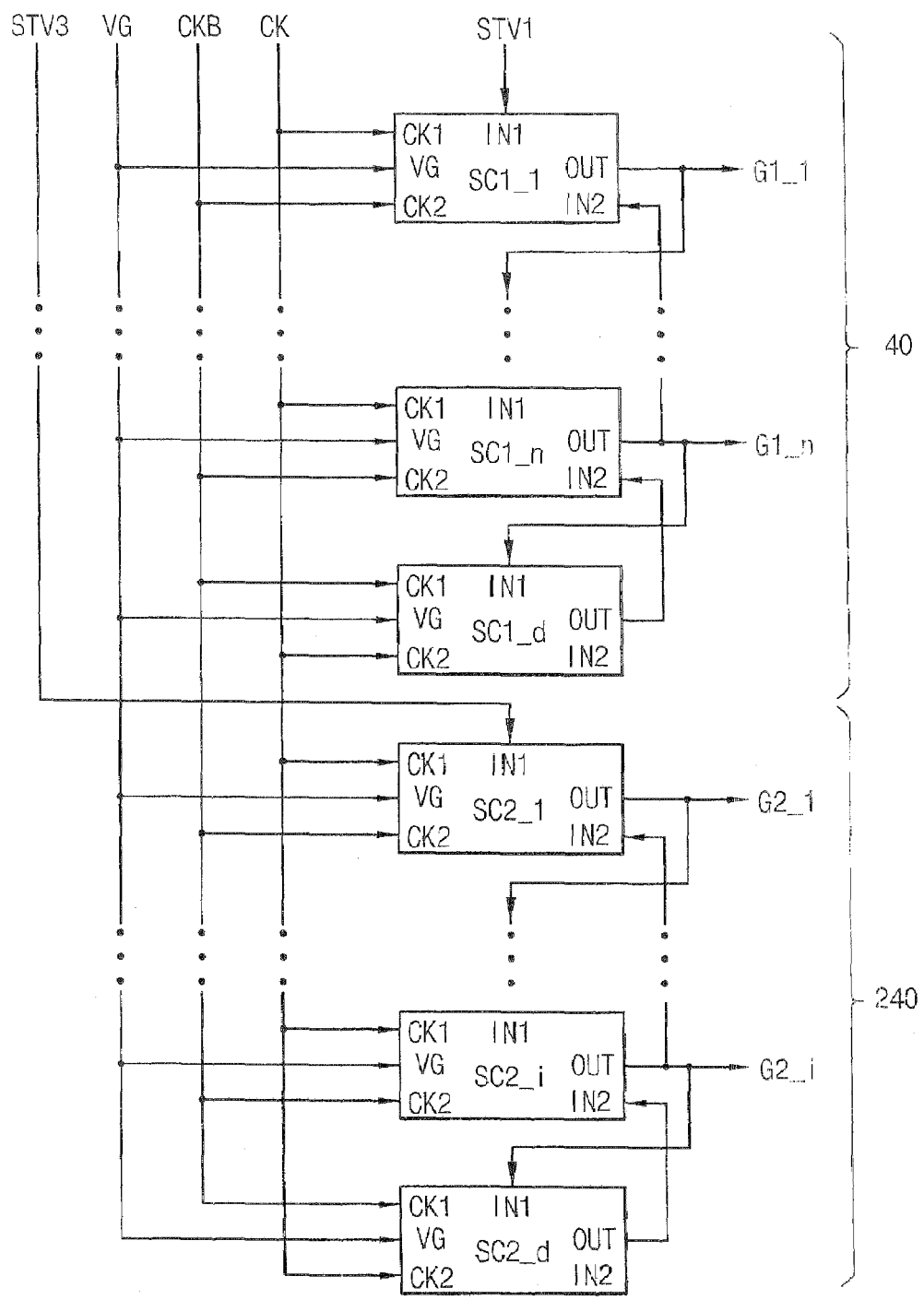
FIG. 3 is a block diagram illustrating a first gate driver and a second gate driver in accordance with an exemplary embodiment of the present invention.

FIG. 3 is a block diagram illustrating a first gate driver and a second gate driver in accordance with an exemplary embodiment of the present invention.

Referring to FIGS. 1 to 3, the gate driver 140 may have a driving mode, in which gate signals $G1\_1 \ldots G1\_n$ are sequentially output in a forward-direction.

The first gate driver 140 includes an n number of stages $SC1\_1 \ldots SC1\_n$ corresponding to a plurality of gate lines $GL1\_1 \ldots GL1\_n$ and a dummy stage $SC1\_d$. A plurality of the stages $GL1\_1 \ldots GL1\_d$ are cascade-connected to each other.

Each of the stages includes a first input terminal IN1, an output terminal OUT, a second input terminal IN2, a first clock terminal CK1, a second clock terminal CK2 and a power terminal VG. The first input terminal IN1 of the first stage SC1_1 receives the first vertical start signal STV1, which is the first gate control signal of starting the first gate driver 140. The rest of the stages of the first input terminal IN1 except for the first stage SC1_1 receive an output signal of a former stage. The second input terminal IN2 receives an output signal of a next stage. The output terminals OUT of each stage are connected to the gate lines $GL1\_1 \ldots GL1\_n$.

The first and second clock terminals CK1 and CK2 of the plurality of stages $SC1\_1 \ldots SC1\_n$ receives the first and second clock signals CK and CKB, respectively. The first clock signal CK may have an opposite phase to that of the second clock signal CKB. An odd-numbered stage outputs the gate signal in response to the first clock signal CK applied to the first clock terminal CK1 and an even-numbered stage outputs the gate signal in response to the second clock signal CKB applied to the first clock terminal CK2.

The second gate driver 240 includes i-number of stages, $SC2\_1 \ldots SC2\_i$ corresponding to a plurality of gate lines $GL2\_1 \ldots GL2\_i$ and a dummy stage $SC2\_d$. A plurality of the stages $SC2\_1 \ldots SC2\_d$ are cascade-connected to each other.

The stages $SC2\_1 \ldots SC2\_d$ include a first input terminal IN1, an output terminal OUT, a second input terminal IN2, a first clock terminal CK1, a second clock terminal CK2 and a power terminal VG. The first input terminal IN1 of the first stage SC2_1 receives the third vertical start signal STV3, which is the second gate control signal of starting the second gate driver 240. The rest of the stages of the first input terminal IN1 receive an output signal of a former stage. The second input terminal N2 receives an output signal of the next stage.

The first and second clock terminals CK1 and CK2 of the plurality of stages $SC2\_1 \ldots SC2\_d$ respectively receives the first and second clock signal CK and CKB provided to the first gate driver 140.

Figure 4:
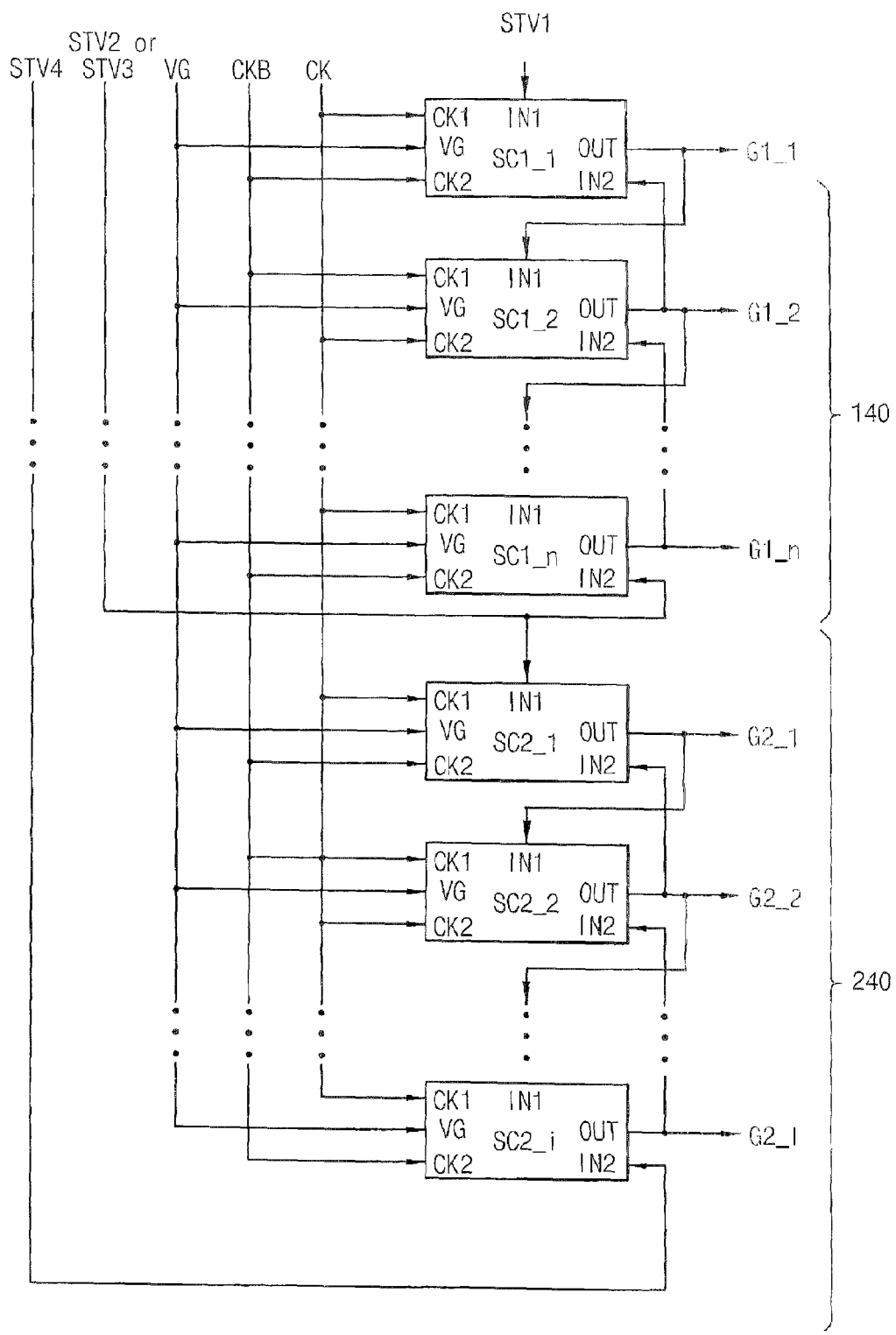
FIG. 4 is a block diagram illustrating a first gate driver and a second gate driver in accordance with an exemplary embodiment of the present invention.

FIG. 4 is a block diagram illustrating a first gate driver and a second gate driver in accordance with an exemplary embodiment of the present invention.

Referring to FIGS. 2 and 4, the first gate driver 140 may have a bi-directional driving mode, which sequentially outputs the gate signals $G1\_1 \ldots G1\_n$ in a forward-direction or outputs the gate signals $G1\_n \ldots G1\_1$ sequentially in a backward-direction according to the control of the driver 120.

The first gate driver 140 includes n number of stages $SC1\_1 \ldots SC1\_n$ corresponding to a plurality of gate lines $GL1\_1 \ldots GL1\_n$, which are cascade-connected to each other. Each stage includes a first input terminal IN1, an output terminal OUT, a second input terminal IN2, a first clock terminal CK1, a second clock terminal CK2 and a power terminal VG.

The first gate driver 140 receives a first vertical start signal STV1 and a second vertical start signal STV2, which is the first gate control signal. The second vertical start signal STV2 is delayed longer than the first vertical start signal STV1, by n×1H, wherein 'H' is a horizontal interval.

When the first gate driver is in a forward-direction driving mode, the first vertical start signal STV1 may be inputted to the first input terminal IN1 of the first stage SC1_1 and the second vertical start signal STV2 may be inputted to the second input terminal IN2 of the last stage SC1_n.

Alternately, when the first gate driver is in a backward-direction driving mode, the first vertical start signal STV1 may be inputted to the second input terminal IN2 of the last stage and the second vertical start signal STV2 may be inputted to the first input terminal IN1 of the first stage.

Then, the rest of the stages of the first input terminal IN1 except for the first and last stages receive an output signal of a former stage and the second input terminal IN2 thereof receives an output signal of the next stage.

A plurality of stages $SC1\_1 \ldots SC1\_n$ of the first and second clock terminals receive first and second clock signals CK and CKB, respectively.

The second gate driver 240 includes an i number of stages $SC2\_1 \ldots SC2\_i$ corresponding to a plurality of gate lines, which are cascade-connected to each other. Each stage includes a first input terminal IN1, an output terminal OUT, a second input terminal IN2, a first clock terminal CK1, a second clock terminal CK2 and a power terminal VG.

The second gate driver 240 receives a third vertical start signal STV3 and a fourth vertical start signal STV4, which is the second gate control signal. The fourth vertical start signal STV4 is delayed longer than the third vertical start signal STV3 by i×1H, wherein 'H' is a horizontal interval. The third vertical start signal STV3 is inputted to the first input terminal IN1 of the first stage SC1_1 and the fourth vertical start signal STV4 is inputted to the second input terminal 1N2 of the last stage SC1_n.

The second vertical start signal STV2 and the third vertical start signal STV3 may be the same signal. When the second vertical start signal STV2 and the third vertical start signal STV3 are the same, the last stage of the first gate driver 140 and the first stage of the second gate driver 240 receive the same vertical start signal, for example, the second vertical start signal STV2 or the third vertical start signal STV3. Therefore, when the last gate signal of the first gate driver 140 is output, the second gate driver 240 starts being driven.

The third vertical start signal STV3 may be delayed longer than the second vertical start signal STV2 by a predetermined time, and may be inputted respectively to the last stage of the first gate driver 140 and to the first stage of the second driver 240.

The first and second clock terminals CK1 and CK2 of the stages SC2_1 and SC2_i receive the first and second clock signal CK and CKB inputted to the first gate driver 140.

Figure 5:
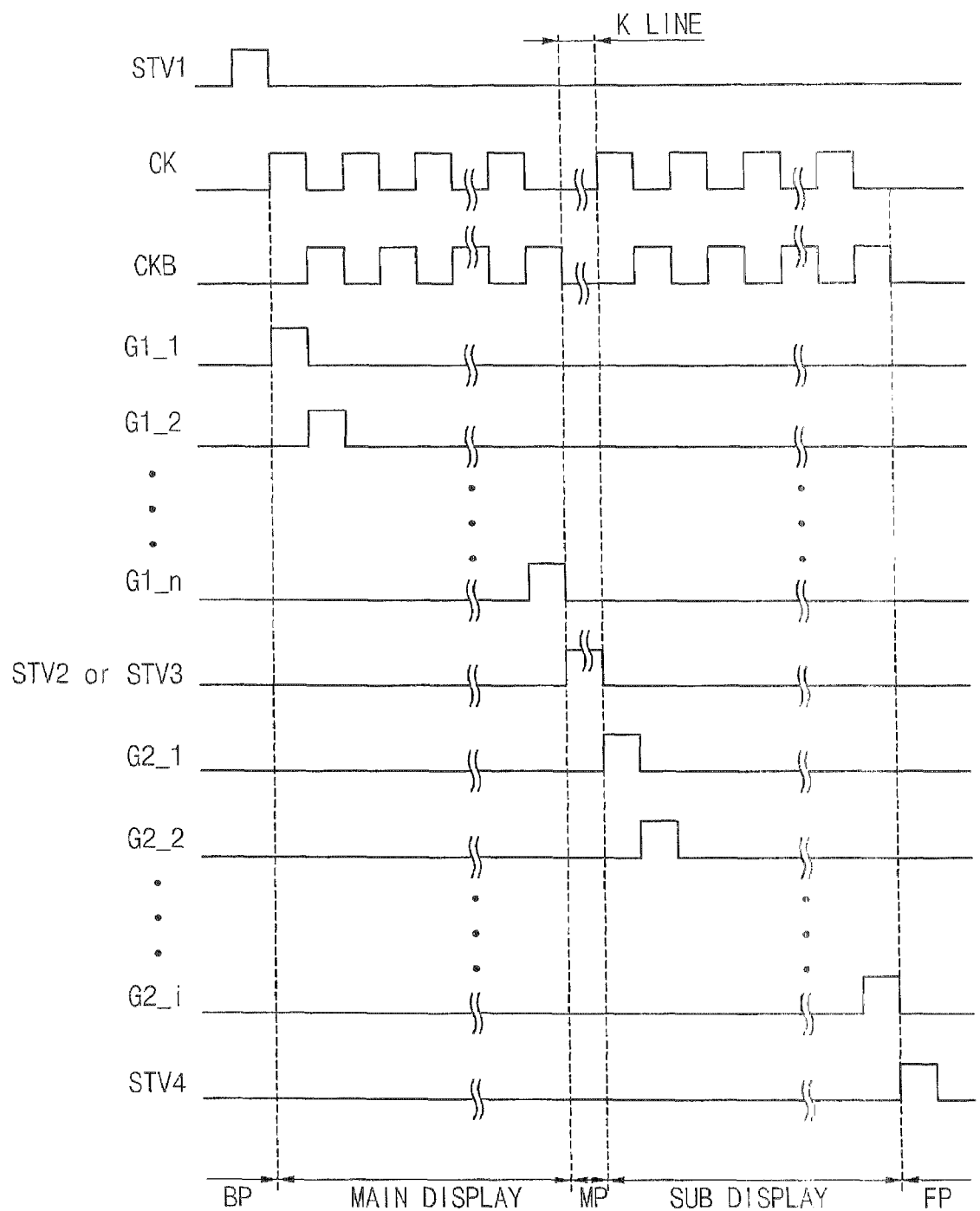
FIG. 5 is a timing chart illustrating a method of driving the first gate driver and the second gate driver in accordance with an exemplary embodiment of the present invention.

FIG. 5 is a timing chart illustrating a method of driving a first gate driver and a second gate driver in accordance with an exemplary embodiment of the present invention.

Referring to FIGS. 2, 4 and 5, the gate controller 127 outputs the common control signals CK and CKB to the first and second gate drivers 140 and 240, and the first and second gate control signals to the first and second gate drivers 140 and 240 in a back-porch interval BP, a middle-porch interval MP and a front-porch interval FP.

The gate controller 127 outputs the first vertical start signal STV1 to the first gate driver 140 in a back-porch interval BP. The first gate driver 140 starts being driven when the first vertical start signal STV1 is inputted thereto and sequentially outputs the gate signals G1_1 ... G1_n to the gate lines GL1_1 ... GL1_n of the first display panel 100, respectively.

Then, the gate controller 127 outputs the second vertical start signal STV2 to the first and second gate drivers 140 and 240 in a middle-porch interval MP. The gate controller 127 outputs the first and second clock signals CK and CKB delayed by a pulse-width of the second vertical start signal STV2. The pulse-width of the second vertical start signal STV2 may be designed variously as to be a k×1H interval, wherein 'k' is an integer equal to or greater than one.

The first gate driver 140 stops being driven in response to the second vertical start signal STV2 and the second gate driver 240 starts being driven in response to the second vertical start signal STV2. The second gate driver 240 sequentially outputs the gate signals G2_1 ... G2_i to the gate lines GL2_1 ... GL2_i of the second display panel 200.

Then, the gate controller 127 outputs the fourth vertical start signal STV4 to the second gate driver 240 in a front-porch interval FP. Then, the second gate driver 240 stops being driven in response to the fourth vertical start signal STV4.

In this way, the first and second gate driver 140 and 240 are driven by sharing the first and second clock signals CK and CKB together. Therefore, the number of the signal lines formed at the peripheral region of the first display panel 100 is reduced and a narrow bezel of the display device is realized easily.

Figure 6:
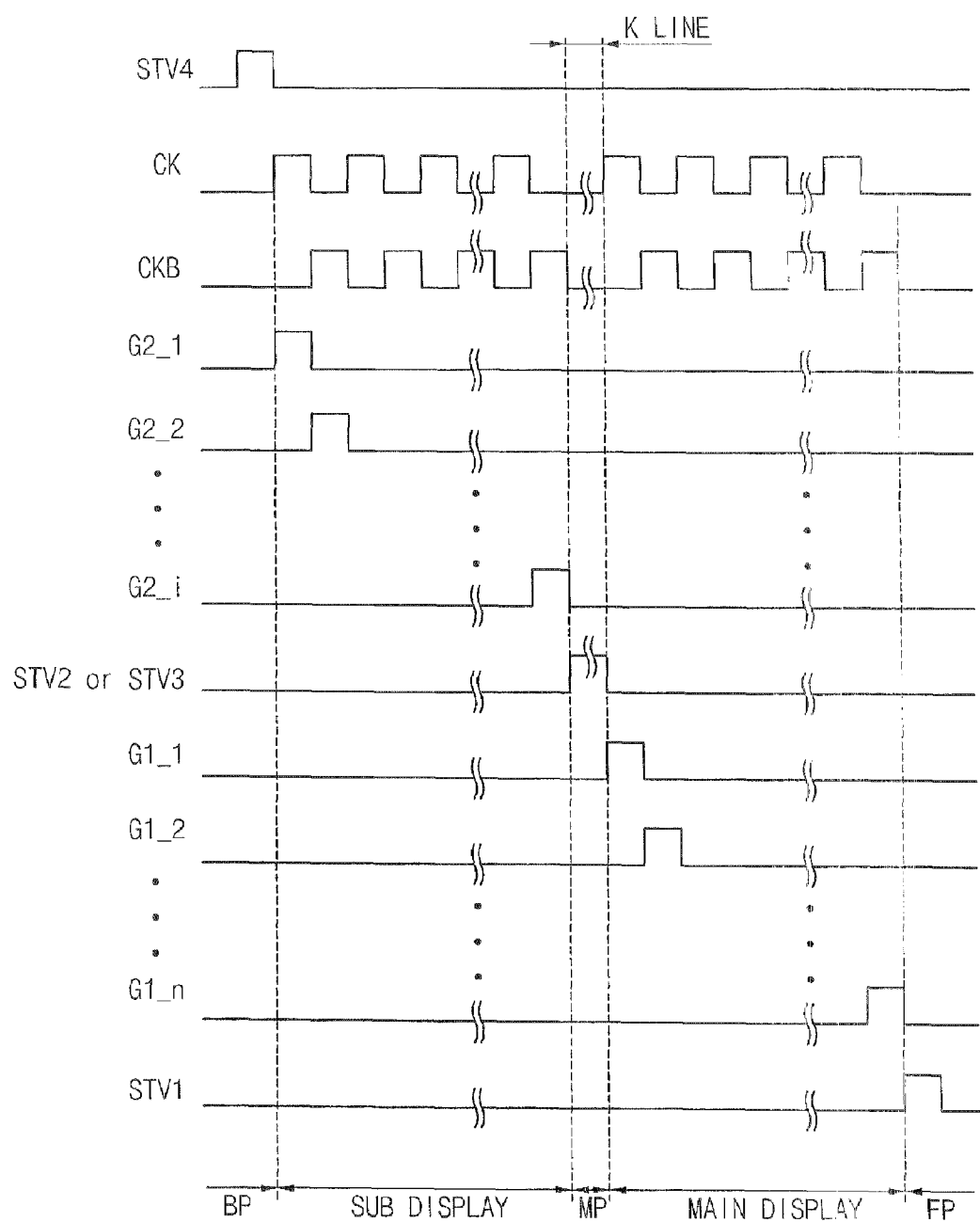
FIG. 6 is a timing chart illustrating a method of driving the first gate driver and the second gate driver in accordance with an exemplary embodiment of the present invention.

FIG. 6 is a timing chart illustrating a method of driving a first gate driver and a second gate driver in accordance with an exemplary embodiment of the present invention.

Referring to FIG. 6, a second gate driver 240 is driven first and then a first gate driver 140 is driven.

The gate controller 127 outputs a fourth vertical start signal STV4 to the second gate driver 240 in a back-porch interval BP. The second gate driver 240 sequentially outputs gate signals G2_1 ... G2_i when the fourth vertical start signal STV4 is inputted.

Then, the gate controller 127 outputs a second vertical start signal STV2 to the first and second gate drivers 140 and 240 in a middle-porch interval MP. The gate controller 127 outputs the first and second clock signals CK and CKB delayed by a pulse-width (or MP) of the second vertical start signal STV2.

Then, the second gate driver 240 stops being driven in response to the second vertical start signal STV2, and the first gate driver 140 starts being driven in response to the second vertical start signal STV2. The first gate driver 140 sequentially outputs the gate signals G1_1 ... G1_n.

Then, the gate controller 127 outputs a first vertical start signal STV1 to the first gate driver 140 in a front-porch interval FP. Then, the first gate driver 140, stops being driven.

Figure 7:
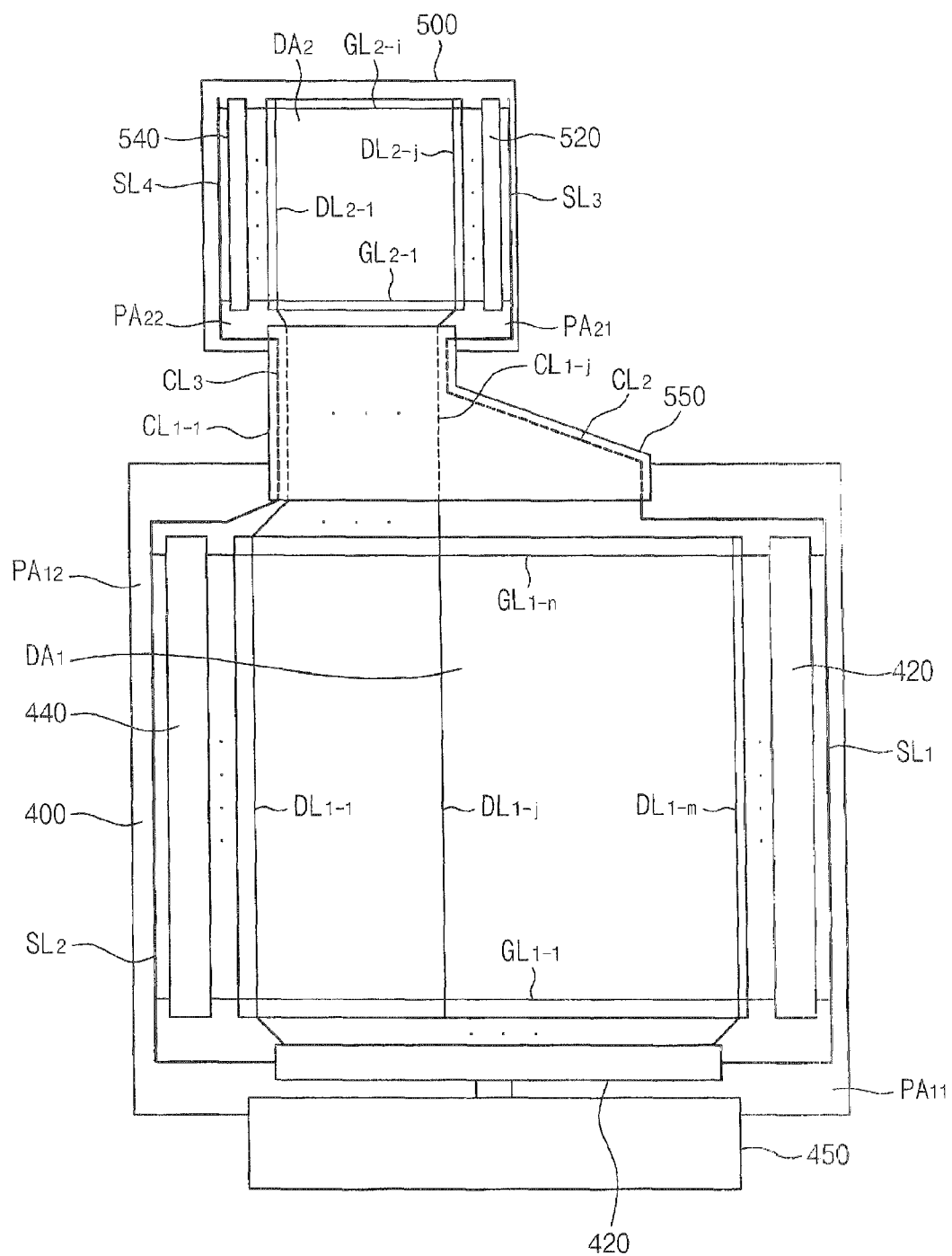
FIG. 7 is a plan view illustrating a display device in accordance with an exemplary embodiment of the present invention.

FIG. 7 is a plan view illustrating a display device in accordance with an exemplary embodiment of the present invention.

Referring to FIG. 7, the display device includes a first display panel 400, a first FPCB 450, a second display panel 500 and a second FPCB 550. The first FPCB 450 connects the first display panel 400 to an external device. The second FPCB 550 connects the second display panel 500 to the first display panel 400.

The first display panel 400 includes a first display region $DA_1$, a first peripheral region $PA_{11}$ and a second peripheral region PA12. The first and second peripheral regions $PA_{11}$ and $PA_{12}$ surround the first display region $DA_1$. An n number of gate lines $GL_{1\_1} \ldots GL_{1\_n}$ and an m number of source lines $D_{L1\_1} \ldots DL_{1\_m}$ are formed in the first display region $DA_1$. The gate lines $GL_{1\_i} \ldots GL_{1\_n}$ are not parallel with the source lines $DL_{1\_1} \ldots DL_{1\_m}$.

A first gate driver 420 is integrated at the first peripheral region $PA_{11}$. A first signal line part $SL_1$, which transmits first and second clock signals CK1 and CKB1 to the first gate driver 420, is formed at the first peripheral region $PA_{11}$. A second gate driver 440 is integrated at the second peripheral region $PA_{12}$ facing the first peripheral region $PA_{11}$. A second signal line part $SL_2$, which transmits third and fourth clock signals CK2 and CKB2, is formed at the second peripheral region PA12. The first gate driver 420 outputs the gate signal to odd-numbered gate lines and the second gate driver 440 outputs the gate signal to even-numbered gate lines.

The second display panel 500 includes a second display region $DA_2$, a first peripheral region $PA_{21}$ and a second peripheral region $PA_{22}$. The first and second peripheral regions $PA_{21}$ and $PA_{22}$ surround the second display region $DA_2$. An i number of gate lines $GL_{2\_1} \ldots GL_{2\_i}$ and a j number of source lines $DL_{2\_1} \ldots GL_{2\_j}$ are formed in the second display region $DA_2$. The gate lines $GL_{2\_1} \ldots GL_{2\_i}$ are not parallel with the source lines $DL_{2\_1} \ldots DL_{2\_j}$.

A third gate driver 520 is integrated at the first peripheral region $PA_{21}$. A third signal line part SL3, which transmits first and second clock signals CK1 and CKB1 to the third gate driver 520, is formed at the first peripheral region PA21. A fourth gate driver 540 is integrated at the second peripheral region PA22 facing the first peripheral region PA21. A fourth signal line part SL4, which transmits third and fourth clock signals CK2 and CKB2, is formed at the second peripheral region PA22. The third gate driver 520 outputs a gate signal to odd-numbered gate lines and the fourth gate driver 540 outputs a gate signal to even-numbered gate lines.

A first connecting line part $CL_{1\_1} \ldots CL_{1\_j}$ is formed at the second FPCB 550. The first connecting line part $CL_{1\_1} \ldots CL_{1\_j}$ electrically connects the source lines $DL_{1\_1} \ldots DL_{1\_j}$ of the first display panel 400 to the gate lines $GL_{1\_1} \ldots GL_{1\_j}$ of the second display panel 500.

In addition, the second FPCB 550 includes a second connecting line part CL2 and a third connecting line part CL3. The second connecting line part CL2 connects the first signal line part SL1 formed at the first display panel 400 and the third signal line part SL3 formed at the second display panel 500. The third connecting line part CL3 connects the second signal line part SL2 formed at the first display panel 400 and the fourth signal line part SL4 formed at the second display panel 500.

The first and third gate drivers 420 and 520 share the first and second clock signals CK1 and CKB1. The second and fourth gate drivers 440 and 540 share the third and fourth clock signals CK2 and CKB2 together. Therefore, the number of lines formed at the first and second peripheral regions PA11 and PA12 of the first display panel 400 is reduced and a narrow bezel of the display device is realized easily.

Although the exemplary embodiments of the present invention have been described, it is to be understood that the present invention should not be construed as limited to these exemplary embodiments but various changes and modifications can be made by one ordinary skilled in the art within the spirit and scope of the present invention as hereinafter claimed.

What is claimed is:

1. A display device comprising:
a first display panel having a first display region, in which first gate lines are formed, and a first peripheral region surrounding the first display region;
a first gate driver located on the first peripheral region and outputting a first gate signal to the first gate lines in response to a first clock signal and a second clock signal;
a second display panel electrically connected with the first display panel, and having a second display region, in which second gate lines are formed, and a second peripheral region surrounding the second display region; and
a second gate driver located on the second peripheral region and outputting a second gate signal to the second gate lines in response to the first and second clock signals.

2. The display device of claim 1, further comprising:
a first signal line part in the first peripheral region to transmit the first clock signal and second clock signal; and
a second signal line part in the second peripheral region electrically connected with the first signal line part.

3. The display device of claim 2, further comprising a flexible printed circuit board electrically connecting the first display panel and the second display panel, the flexible printed circuit board having a connecting line part connecting the first and second signal line parts.

4. The display device of claim 1, further comprising a driver outputting the first clock signal and the second clock signal.

5. The display device of claim 4, wherein the driver outputs a first vertical start signal to the first gate driver, and a second vertical start signal to the second gate driver after the first vertical start signal is output.

6. The display device of claim 5, wherein each of the first gate driver and the second gate driver comprises a plurality of stages cascade-connected to each other, and the first and second vertical start signals are inputted to each first stage of the first and second gate drivers, respectively.

7. The display device of claim 4, wherein the driver outputs the first vertical start signal to the first gate driver, outputs the second vertical start signal to the first and second gate drivers after a first predetermined time, and outputs a third vertical start signal to the second gate driver after a second predetermined time.

8. The display device of claim 7, wherein each of the first gate driver and the second gate driver comprises a plurality of stages being cascade-connected to each other, the first vertical start signal is inputted to a first stage of the first gate driver, the second vertical start signal is inputted to a last stage of the first gate driver and a first stage of the second driver, and the third vertical start signal is inputted to a last stage of the second gate driver.

9. The display device of claim 7, wherein the driver outputs the first and second clock signals delayed by a pulse-width of the second vertical start signal.

10. The display device of claim 9, wherein the pulse-width of the second vertical start signal corresponds to a middle-porch interval.

11. The display device of claim 7, wherein the driver outputs the first vertical start signal in a back-porch interval and outputs the third vertical start signal in a front-porch interval.

12. A method of driving a display device including a first display panel and a second display panel, the method comprising:
outputting first gate signals from a first gate driver to first gate lines formed on a first display region of the first display panel in response to a first clock signal and a second clock signal, wherein the first gate driver is located on a first peripheral region surrounding the first display region; and
outputting second gate signals from a second gate driver to second gate lines formed on a second display region of the second display panel in response to the first clock signal and the second clock signal, wherein the second gate driver is located on a second peripheral region surrounding the second display region.

13. The method of claim 12, wherein the first gate signals are sequentially output when a first vertical start signal is inputted to the first gate driver.

14. The method of claim 13, wherein the second gate signals are sequentially output when a second vertical start signal is inputted to the second gate driver.

15. The method of claim 12, wherein outputting the first gate signals comprises:
sequentially outputting the first gate signals when a first vertical start signal is inputted to the first gate driver; and
stopping the output of the first gate signals when a second vertical start signal is inputted to the first gate driver after a first predetermined time.

16. The method of claim 15, wherein outputting the second gate signals comprises:
sequentially outputting the second gate signals when the second vertical start signal is inputted to the second gate driver; and
stopping the output of the second gate signals when a third vertical start signal is inputted to the second gate driver after a second predetermined time.

17. The method of claim 16, wherein each of the second gate signals is outputted in response to the first clock signal and the second clock signal delayed by a pulse-width of the second vertical start signal.

18. The method of claim 17, wherein the pulse-width of the second vertical start signal corresponds to a middle-porch interval.

* * * * *